Patented Mar. 10, 1925.

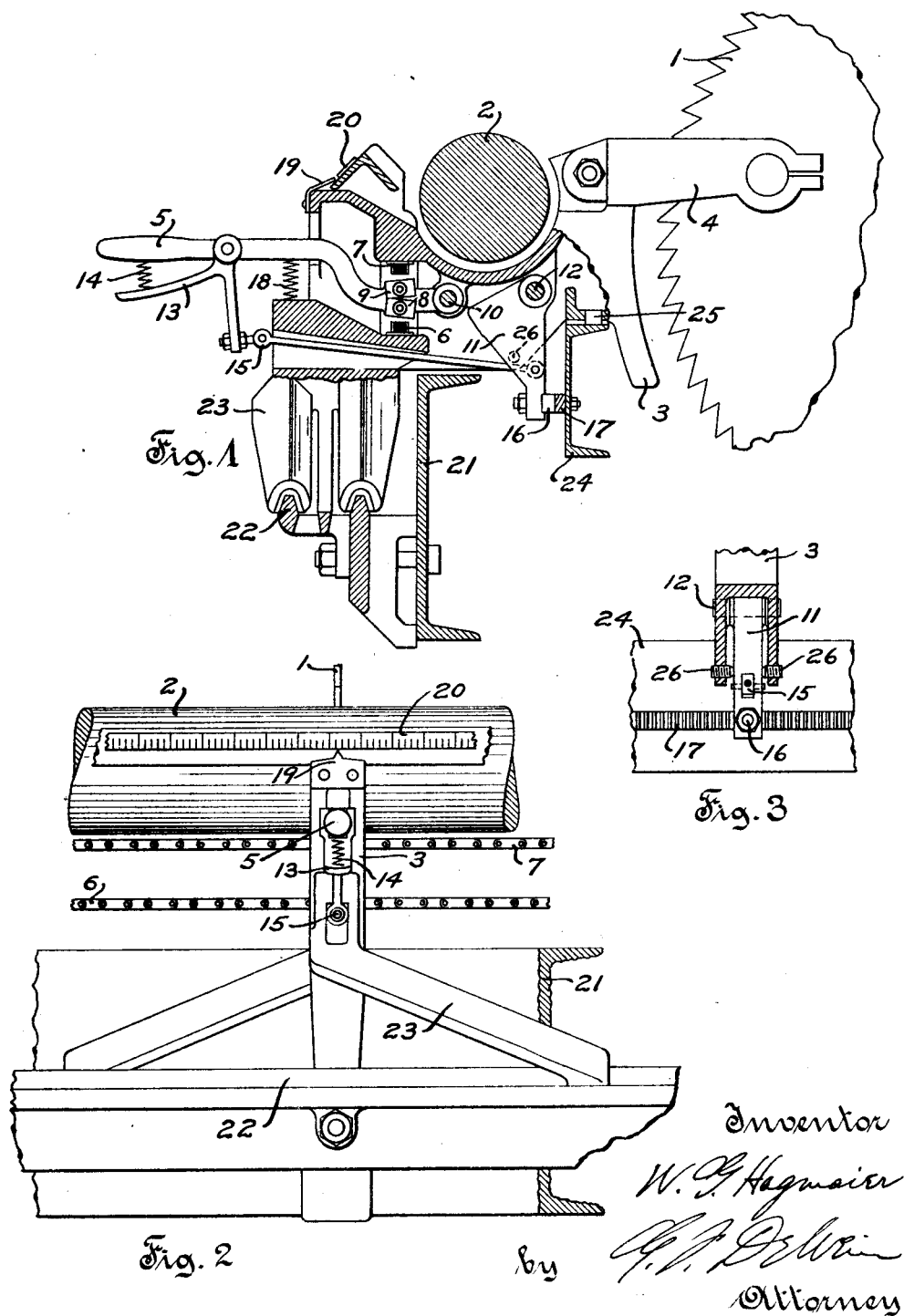
March 10, 1925.
W. G. HAGMAIER
SAW SHIFTER
Filed April 13, 1922
1,529,640

1,529,640

UNITED STATES PATENT OFFICE.

WILLIAM G. HAGMAIER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

SAW SHIFTER.

Application filed April 13, 1922. Serial No. 552,158.

*To all whom it may concern:*

Be it known that WILLIAM G. HAGMAIER, a citizen of the United States, residing at West Allis, in the county of Milwaukee and State of Wisconsin, has invented a certain new and useful Improvement in Saw Shifters, of which the following is a specification.

This invention relates in general to improvements in saw mill machinery, and relates more specifically to improvements in the construction and operation of saw shifting devices especially applicable to circular saws such as edgers.

An object of the invention is to provide simple and efficient means for laterally shifting a saw. Another object of the invention is to provide an improved power operated shifter for circular saws. A further object of the invention is to provide one or more power driven traveling elements and means for connecting a saw to these elements when it is desired to shift the saw laterally. Still another object of the invention is to provide simple and efficient manually actuated controlling means for connecting a saw to a continuously traveling element. A further object of the invention is to provide an efficient lock for power actuated saw shifters. Another object of the invention is to provide improvements in the construction and operation of saw shifters of the type covered by U. S. Patent 1,344,203, granted June 22, 1920. These and other objects and advantages attained by the present invention, will be apparent from the accompanying specification.

A clear conception of an embodiment of the invention and of the operation of a device constructed in accordance therewith, may be had by referring to the drawing accompanying and forming a part of this specification, in which like reference characters designate the same or similar parts in the various views.

Fig. 1 is a transverse vertical section through a portion of a power actuated saw shifting mechanism.

Fig. 2 is a fragmentary front elevation of a power actuated saw shifting mechanism.

Fig. 3 is a fragmentary part sectional view of the locking latch and associated elements of an improved power actuated saw shifting mechanism.

The edger to which the present invention is especially applicable, is disclosed more in detail in the patent hereinabove referred to, and comprises in general one or more laterally shiftable rotary circular saws 1, a shifter bracket 3 located adjacent to the front of each saw 1 and arranged for lateral sliding movement along stationary rails 22, a shifter arm connecting each shifter bracket 3 with an adjacent saw 1, a stationary frame comprising a plurality of members 21, 24 to one of which the rails 22 are attached, and feed rollers 2 mounted in bearings in the stationary frame above the shifter bracket 3 and in proximity to the shifter arm 4. The saws 1 are laterally slidably supported upon an arbor, and are capable of being shifted without interrupting or interferring with their rotation.

Each of the shifter brackets 3 is provided with legs 23 coacting with the rails 22, and has a bearing shoe 25 resting upon an upper surface of the frame member 24 closely adjacent to the saw 1 and shifter arm 4. The manually operable shifting lever 5 is secured to the bracket 3 by means of a horizontal pivot 10 and is movable in a vertical plane only, being normally held in neutral position as indicated in Fig. 1, by means of a helical spring 18. Gripping shoes 8, 9 carried by the lever 5 are adapted for coaction respectively with lower and upper stretches 6, 7 of a continuously traveling power driven element or chain, and during such coaction clamp the respective stretches 6, 7 against movement relatively to the bracket 3. The arm 5 has a lock releasing lever 13 pivotally attached thereto, this lever 13 being normally held in the position indicated in Fig. 1, by means of resilient means comprising a helical spring 14. A downwardly extending arm of the lever 13 is connected to a locking latch support or plate 11 by means of a connection 15, the plate 11 being attached to the bracket 3 closely adjacent to the saw 1, by means of a horizontal pivot 12. Lateral displacement of the plate 11 relatively to the bracket 3 is prevented by a pair of adjustable set screws 26 cooperating with opposite side faces of the plate 11. The lower extremity of the plate 11 is provided with a lock comprising locking latch 16 cooperable with a stationary notched member 17 which is secured to the frame member 24 in close proximity to the saw 1. An indicator 19 carried by the bracket 3 cooperates with an indicator plate or gage 20 mounted upon the stationary frame, to indicate the position of the saw and to enable accurate setting of the saw.

During normal operation of the machine, the saws 1 are being rotated in the usual manner in an anti-clockwise direction as viewed in Fig. 1, and the feed rollers 2 are being rotated in a clockwise direction as viewed in this figure, in order to deliver the lumber toward the saw 1 over the guide arm 4. If it becomes desirable to shift a saw 1 the operating arm 5 of the saw 1 which is to be displaced, may be raised or lowered depending upon the desired direction of lateral movement or shifting of the saw. If the operating lever 5 is raised the upper shoe 9 grips the upper stretch 7 of the power driven chain, and causes the bracket 3 and the corresponding saw 1 to move simultaneously with the stretch 7. If the opposite direction of lateral shifting is desired, the lever 5 may be moved downwardly to cause the lower shoe 8 to grip the lower stretch 6 of the chain. Before actually producing gripping of the stretches 6, 7 the releasing lever 13 should be manipulated to compress the spring 14 and to withdraw the locking latch 16 from the notched member 17. When the desired degree of lateral shifting of the saw 1 has been effected, motion of the saw 1 may be stopped by releasing the lever 13 and the arm 5 whereupon the locking latch 16 will immediately become effective to arrest the movement of the bracket 3, and the arm 5 will assume neutral position as indicated in Fig. 1.

It will be obvious that the power driven traveling element provides simple and efficient means for rapidly shifting the saws 1. By placing the shifter lock closely adjacent to the saws 1, lost motion between the shifter and the saw blade is reduced to a minimum and the saws 1 are firmly held in adjusted position. The side stops or set screws 26 permit reduction of lost motion between the frame 3 and plate 11 to a minimum, these screws being readily adjustable to take up wear.

It should be understood that it is not desired to limit the invention to the exact details of construction and of operation herein shown and described for various modifications within the scope of the claims, may occur to persons skilled in the art.

It is claimed and desired to secure by Letters Patent:

1. In combination, a laterally movable saw, a shifter associated with said saw, means for moving said shifter to shift said saw, a lock for said shifter, a movable support for said lock, adjustable means coactable with opposed portions of said support to prevent relative lateral displacement of said shifter and said support, a connection between said support and said shifter moving means, and resilient means acting through said connection to move said support and said lock toward locking position.

2. In combination, a laterally movable saw, a shifter associated with said saw, power actuated means for laterally shifting said saw through said shifter, means for temporarily connecting said shifter with said power actuated means, a lock for said shifter, a pivoted support for said lock, adjustable means coactable with opposed portions of said support to prevent relative lateral displacement of said shifter and said support, a connection between said support and said connecting means, and resilient means acting through said connection to move said support and said lock toward locking position.

3. In combination, a laterally movable saw, a shifter associated with said saw, power actuated means for laterally shifting said saw through said shifter, means for temporarily connecting said shifter with said power actuated means, a lock for said shifter located closely adjacent to said saw, a pivoted plate associated with said lock, adjustable means carried by said shifter and coactable with opposed faces of said plate to prevent relative lateral displacement of said shifter and said plate, a connection between said support and said connecting means, and resilient means acting through said connection to move said support and said lock toward locking position.

4. In combination, a laterally movable circular saw, a shifter directly engageable with opposed faces of said saw, power actuated means for laterally shifting said saw through said shifter, means for temporarily connecting said shifter with said power actuated means, a lock for said shifter located closely adjacent to said saw and between said saw and said power actuated means, a pivoted plate providing a support for said lock, adjustable means carried by said shifter and coactable with opposed faces of said plate to prevent relative lateral displacement of said shifter and said plate, a connection between said support and said connecting means, and resilient means acting through said connection to move said support and said lock toward locking position.

5. In combination, a laterally movable saw, a shifter directly engageable with said saw, means for moving said shifter to shift said saw, a lock for said shifter, a pivoted plate associated with said lock, adjustable means carried by said shifter and coactable with opposed faces of said plate to prevent relative lateral displacement of said shifter and said plate, a connection between said support and said shifter moving means, and resilient means acting through said connection to move said support and said lock toward locking position.

In testimony whereof, the signature of the inventor is affixed hereto.

WILLIAM G. HAGMAIER.